June 30, 1964 R. C. HUNGERFORD ETAL 3,139,098
LENS WASHING MACHINE
Filed Aug. 13, 1963 2 Sheets-Sheet 1

INVENTORS
RICHARD C. HUNGERFORD
FRANK E. BROWN
BY
Eckhoff + Shirt
ATTORNEYS

INVENTORS
RICHARD C. HUNGERFORD
BY FRANK E. BROWN

Eckhoff + Sliv
ATTORNEYS

United States Patent Office 3,139,098
Patented June 30, 1964

3,139,098
LENS WASHING MACHINE
Richard C. Hungerford, Sunnyvale, and Frank E. Brown, Burbank, Calif., assignors to Barnes-Hind International, Inc., a corporation of California
Filed Aug. 13, 1963, Ser. No. 301,737
2 Claims. (Cl. 134—145)

This invention relates to a cleansing device for contact lenses. The device is an improvement of that shown in our co-pending patent application Serial No. 243,700 filed November 28, 1962 which is a continuation-in-part of our application Serial No. 157,157 filed December 5, 1961, now abandoned.

Heretofore, it has been the practice to clean contact lenses by rubbing them between the fingers, normally in the presence of a wetting solution such as the solution used for treating the lenses just prior to insertion in the eyes. This has a number of serious disadvantages. In the first place, the operation is time-consuming, since each lens must be cleansed separately. Secondly, this involves a large amount of handling of the lenses, with the attendant danger of loss and, since the lenses are physically rubbed between the fingers, there is always danger of abrading the lenses. The handling of the lenses with the fingers is further undesirable since the fingers are frequently not clean, so that irritating or infectious materials may be deposited on the lenses. Even clean fingers may deposit cell material which tends to cloud the lenses.

In accordance with the present invention, a washing device is provided for contact lenses which obviates all of the above-enumerated disadvantages.

The device of the present invention can be used as a washing device or it also can be used as a combined washing device and storage receptacle, although it is generally preferable to clean the lenses in a cleansing solution and then transfer them to a soaking solution until they are to be used.

Figures 1, 3:
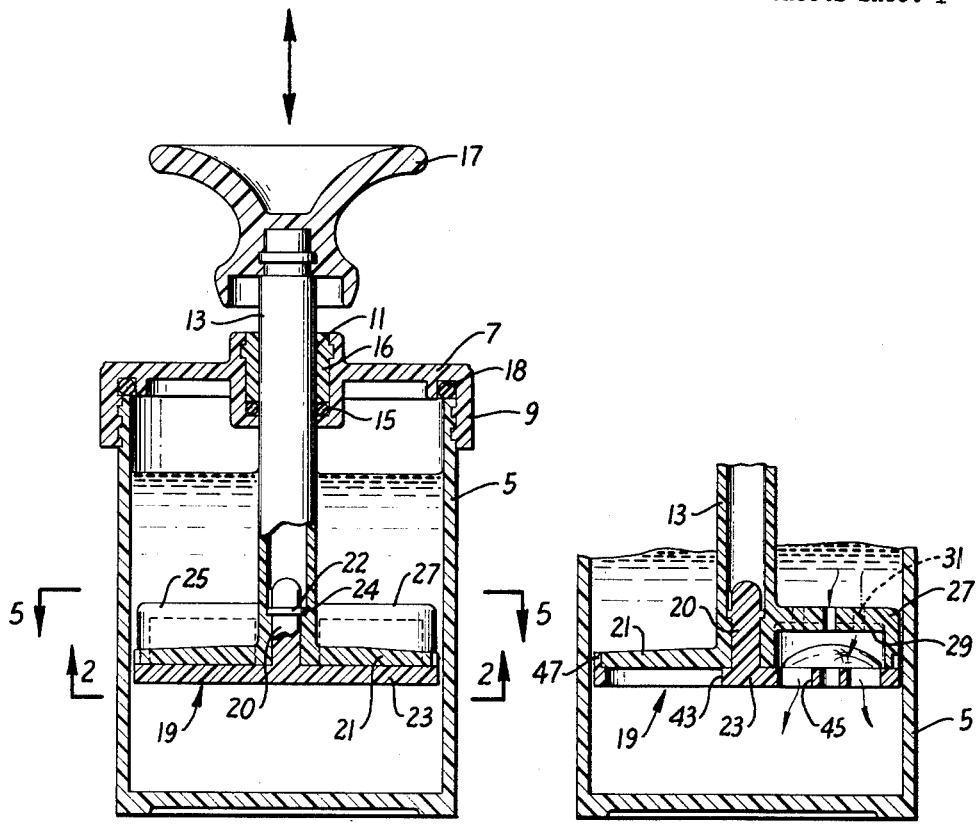
Figure 2:
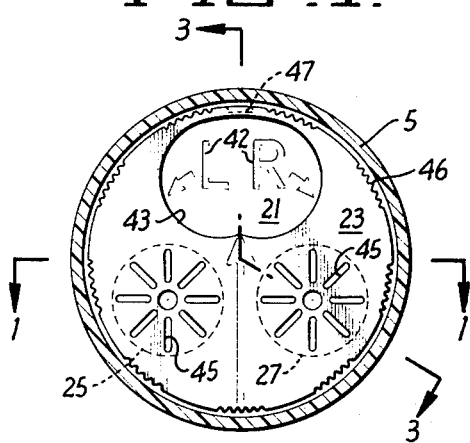
Figure 4:
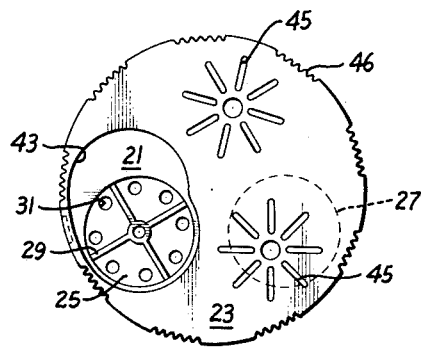
Figure 5:
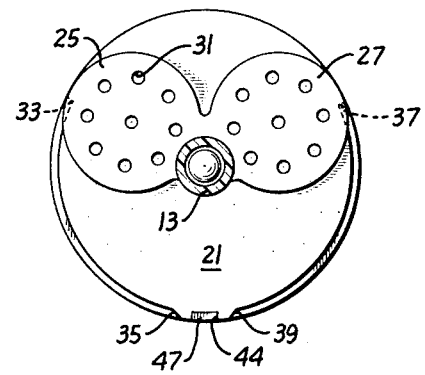
Figure 6:
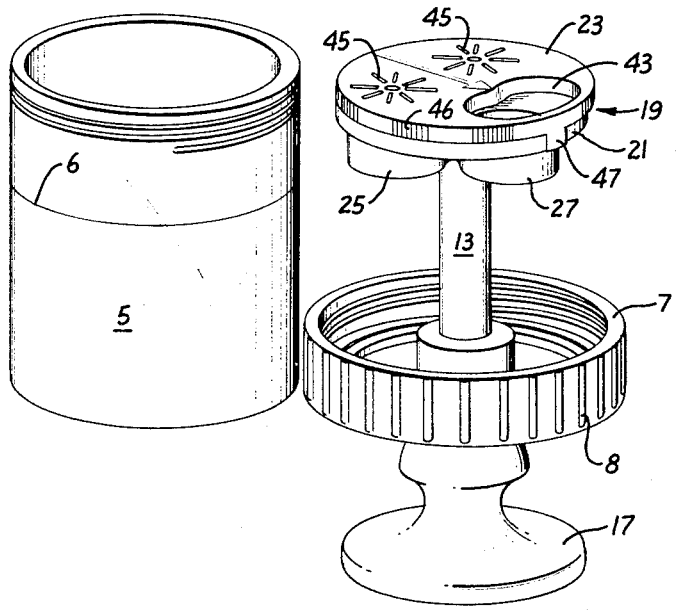

In the drawings forming a part of this application:
FIGURE 1 is a side view of a device embodying the present invention, partly in section.
FIGURE 2 is a sectional view through the device on the lines 2—2 of FIGURE 1.
FIGURE 3 is a partial sectional view of the device on the lines 3—3 of FIGURE 2.
FIGURE 4 is a bottom view of the piston with one chamber open.
FIGURE 5 is a top view of the piston on the line 5—5 of FIGURE 1.
FIGURE 6 is a perspective view of the device shown in FIGURE 1 showing the piston and top withdrawn from the container and inverted.

Turning now to a description of the drawings by reference characters, the washing device comprises a cup-like receptacle 5 which is preferably made of a clear plastic such as polypropylene. A line 6, or other marker can be provided to designate the correct solution level. The device has a cover 7 which is preferably fastened to the cup 5 by means of mating threads 9, although other means of attachment can be used, such as a mating lip and notch, so that the cover may be merely snapped into place. The edge of the cover is preferably serrated as at 8 to provide a better gripping surface. At the center of the cover 7 is a round hole 11 to receive a piston rod 13. Preferably, the hole 11 is provided with an O-ring 15 to provide a better sealing action. The O-ring may be held in place by a bushing 16. A gasket 18 prevents leakage at the edge of the cover. The piston rod 13 is provided with a handle 17 at its upper end so that it may be easily grasped. Handle 17 is preferably large enough to provide a stable base for the rod and cover assembly when they are removed and converted as is shown in FIGURE 6. The opposite end of piston rod 13 is provided a composite piston generally designated 19, which piston is preferably of a soft plastic such as polyethylene or polypropylene so that the danger of scratching the lenses is obviated. The piston 19 comprises an upper disc 21 which is affixed to the rod 13 and a lower disc 23 which is rotatably attached to the rod 13 by a pin 20 which can be integral with the lower disc 23. A collar 22 on pin 20 bearing against shoulder 24 prevents the upper and lower members from separating. Since the pin is made of relatively soft plastic, the device can be assembled merely by pushing the pin 20 into the opening, the parts deforming sufficiently to allow the collar 22 to pass up through the piston rod 13 and engage the shoulder 24.

The upper disc 21 is provided with two lens-receiving cups 25 and 27 each having a closed end and an open end, the latter being flush with the surface of the disc. Each of these cups is of sufficient size to receive a contact lens and the closed end of each of the cups is provided with a plurality of ridges 29 so the lens will be held slightly off the bottom of the cup. Thus the area of contact between the lens and the cup is reduced and the lenses will have less of a tendency to adhere to the cup when wet. The closed ends of the cups are also provided with a plurality of small openings 31 through which solution can pass as is later explained. Three recesses are formed on the periphery of the upper disc. This is most clearly shown in FIGURE 5 where a first recess extends between the points marked 33 to 35 while at the opposite side a corresponding recess extends from 37 to 39. A small recess 41 is formed between the two long recesses described. It will be noted that the shoulders 33 and 37 at the ends of the side recesses as well as the ends of the small center recess 41 are square while the shoulders 35 and 39 are tapered. These recesses form part of the detent system later described. The bottom surface of disc 21 can be provided with indicia 42 such as the letters "L" and "R" to distinguish the two lens cups. The lower disc is provided with an oval opening 43 with its shorter axis equal to or slightly larger than the diameter of the lens-receiving cup while the longer axis is somewhat longer than the diameter of the cup. The longer length facilitates the insertion or removal of a contact lens from an underlying cup. The upper disc is provided with two sets of openings 45 through which solution can pass. The sets of openings 45 line up with the two lens cups when the bottom disc 23 is in the closed position. The lower disc 23 is also provided with a detent 47 which extends upwardly into the recesses which were described in the upper disc. Detent 47 has approximately the same width as the recess 41. When the detent 47 is in the recess 41, the relationship of the upper and lower discs is that shown in FIGURE 2. In other words, both of the lens cups are covered, the openings 45 in the lower disc correspond in a position with the lens cups so that solution can pass through both the upper and lower discs and the lens cups and the indicia 42 are exposed to view. Knurling 46 can be provided so that the disc 23 can be readily grasped and turned even when the user's fingers are wet. If one now grasps the lower disc 23 and turns it to the left, the detent 47 will ride in the recess 37–39 until it is stopped at end 37 of the recess. The parts will then be in the position shown in FIGURE 4 where one of the lens cups has been opened. Thus the device can be largely operated by the sense of feeling which is important since many users have impaired vision, particularly with lenses removed from the eyes. Obviously, if the disc were turned in the opposite direction, the detent 47 would ride in the recess 33–35 until it reached the end 33 of the recess whereupon the right lens cup would be opened. Although the recess is shown on the upper disc and the detent on the lower, it will be apparent to those skilled in the art that the parts could be reversed or that other well known detent means could be employed.

In use, the cap 7 is unscrewed from the cup 5 and the cup filled with a suitable solution up to the filling line 6. The top assembly is inverted as is shown in FIGURE 6 and the handle 17 is of such size and configuration that the assembly will stay upright when placed on a table or similar surface. The disc 23 will then be turned to the right or to the left opening one of the lens cups whereupon a lens can be placed in the cup. The disc is then rotated in the opposite direction opening the other cup and the other lens placed in that cup. The disc 23 is then turned so that the detent 47 is in the slot 44 effectively locking the device. The device is then reassembled and the plunger worked up and down a number of times to thoroughly clean the lenses. Since the area of the piston is quite large when compared with the area of the apertures through which the solution can pass, it is obvious a high-speed jet action will be applied to the surface of the lenses to thoroughly clean them. After the lenses are cleaned the device is disassembled and the lenses removed utilizing the same procedure which was used in placing the lenses in the cleaning device.

Various cleansing solutions can be used in the device of the present invention. In the case of some cleansing solutions which are relatively mild and which will not attack the lenses, even on long contact, the device of the present invention can be used as both a storage and washing device. Thus, the lenses might be placed in the device at night, the handle worked vigorously a few times, and the lenses allowed to stay in the solution until they are again required for use the next morning. If a relatively strong solution is used, the lenses would be washed in the strong solution for a relatively short length of time, removed and rinsed, and then stored in a soaking solution until the lenses were again needed. One convenient way of accomplishing this is to provide two of the containers 5, one of which may be provided with a plan cap. Thus, one of the containers 5 might contain a relatively strong washing solution, while the other container 5 contains a relatively mild soaking solution. The lenses would be first vigorously washed in the cleansing solution and the piston containing the lenses would then be rinsed under the tap and placed in the other container 5 in the relatively mild soaking solution until again required for use.

It is believed obvious that many variations can be made in the exact structure shown without departing from the spirit of our invention.

We claim:

1. A washing device for contact lenses comprising in combination:
   (a) a tubular container adapted to receive a cleansing solution;
   (b) a composite perforated piston fitting said container having a piston rod extending upwardly and terminating in a handle whereby the end of said handle can be grasped and moved to reciprocate the piston within said tubular container;
   (c) said composite piston comprising two mating discs in face-to-face contact, namely an upper disc which is attached to said handle and a lower disc which is rotatably connected to the upper disc;
   (d) each of said discs having holes therethrough so a solution can pass through the disc as the piston is moved in the tubular container; and
   (e) the upper disc having two lens cups formed therein;
   (f) the lower disc having an opening therein, said opening being at least as large as a lens cup;
   (g) the lower disc being rotatable to a first position wherein both cups are closed and to second and third positions wherein the cups are individually opened.

2. The structure of claim 1 wherein detent means is employed to lock the lower disc in closed position and to act as stops when each of the lens cups is opened.

References Cited in the file of this patent

UNITED STATES PATENTS

| | | |
|---|---|---|
| 3,044,089 | Boynton | July 17, 1962 |
| 3,054,412 | Nickell | Sept. 18, 1962 |